US012649586B2

(12) United States Patent
Vinci et al.

(10) Patent No.: US 12,649,586 B2
(45) Date of Patent: Jun. 9, 2026

(54) AIR DATA INDICATING ARRANGEMENT AND METHOD FOR CALIBRATING THE SAME

(71) Applicant: Kopter Group AG, Mollis (CH)

(72) Inventors: Domenico Vinci, Reichenburg (CH); Luca Casciola, Wetzikon (CH)

(73) Assignee: Kopter Group AG, Mollis (CH)

( * ) Notice: Subject to any disclaimer, the term of this patent is extended or adjusted under 35 U.S.C. 154(b) by 0 days.

(21) Appl. No.: 19/103,714

(22) PCT Filed: Jul. 24, 2023

(86) PCT No.: PCT/EP2023/070450
§ 371 (c)(1),
(2) Date: Feb. 13, 2025

(87) PCT Pub. No.: WO2024/037831
PCT Pub. Date: Feb. 22, 2024

(65) Prior Publication Data
US 2026/0008560 A1 Jan. 8, 2026

(30) Foreign Application Priority Data
Aug. 17, 2022 (CH) ..................................... 969/2022

(51) Int. Cl.
*B64D 43/02* (2006.01)
*G01C 5/00* (2006.01)
(Continued)

(52) U.S. Cl.
CPC ............. *B64D 43/02* (2013.01); *G01C 5/005* (2013.01); *G01P 5/16* (2013.01); *G01P 13/025* (2013.01); *G01P 21/025* (2013.01); *G06N 3/08* (2013.01)

(58) Field of Classification Search
CPC .......... B64D 43/02; G01C 5/005; G01P 5/16; G01P 13/025; G01P 21/025; G06N 3/08
(Continued)

(56) References Cited

U.S. PATENT DOCUMENTS 5,349,347 A * 9/1994 Muller ...................... G01P 3/62
73/180
5,901,272 A * 5/1999 Schaefer, Jr. ............. G01P 5/00
701/7
(Continued)

FOREIGN PATENT DOCUMENTS

CN 101808897 A 8/2010
EP 1256811 A2 11/2002
(Continued)

OTHER PUBLICATIONS

International Search Report for Application No. PCT/EP2023/070450 mailed Jun. 10, 2023. 5 pages.
(Continued)

*Primary Examiner* — Eric Blount
(74) *Attorney, Agent, or Firm* — Lerner David LLP

(57) ABSTRACT

An air data indicating and calibrating arrangement and method for a vertical take-off and landing aircraft, in particular a helicopter, for providing information on an air speed of the vertical take-off and landing aircraft and for providing information on an altitude of the vertical take-off and landing aircraft are described. The vertical take-off and landing aircraft includes a pitot tube device for determining a stagnation air pressure at a position of the pitot tube device and a static port device for determining a static air pressure at a position of the static port device. The air data indicating arrangement includes an air speed and altitude determination module to determine in real-time the air speed and the altitude of the vertical take-off and landing aircraft from
(Continued)

flight data by using a regressor obtained by training an artificial neural network with training data.

15 Claims, 5 Drawing Sheets

(51) Int. Cl.
<table>
<tr><td>*G01P 5/16*</td><td>(2006.01)</td></tr>
<tr><td>*G01P 13/02*</td><td>(2006.01)</td></tr>
<tr><td>*G01P 21/02*</td><td>(2006.01)</td></tr>
<tr><td>*G06N 3/08*</td><td>(2023.01)</td></tr>
</table>

(58) Field of Classification Search
USPC ........................................................ 340/966
See application file for complete search history.

(56) References Cited

U.S. PATENT DOCUMENTS

<table>
<tr><td>6,466,888 B1 *</td><td>10/2002</td><td>McCool</td><td>...............</td><td>G05D 1/0825<br>702/144</td></tr>
<tr><td>6,564,628 B1</td><td>5/2003</td><td>Leblond et al.</td><td></td><td></td></tr>
<tr><td>9,932,127 B2 *</td><td>4/2018</td><td>Anderson</td><td>............</td><td>G06N 3/0499</td></tr>
<tr><td>11,747,360 B2 *</td><td>9/2023</td><td>Carvalho</td><td>.................</td><td>G01P 5/14<br>702/50</td></tr>
<tr><td>2002/0169525 A1</td><td>11/2002</td><td>Cronin et al.</td><td></td><td></td></tr>
<tr><td>2009/0089006 A1</td><td>4/2009</td><td>Certain</td><td></td><td></td></tr>
<tr><td>2017/0158347 A1 *</td><td>6/2017</td><td>Anderson</td><td>................</td><td>G06N 3/09</td></tr>
<tr><td>2018/0290766 A1 *</td><td>10/2018</td><td>Piggin</td><td>....................</td><td>G01S 19/14</td></tr>
<tr><td>2020/0309810 A1</td><td>10/2020</td><td>Carvalho et al.</td><td></td><td></td></tr>
<tr><td>2022/0355948 A1 *</td><td>11/2022</td><td>Nadkarni</td><td>...............</td><td>G01P 5/175</td></tr>
</table>

FOREIGN PATENT DOCUMENTS

<table>
<tr><td>KR</td><td>101563436 B1 *</td><td>10/2015</td><td>...............</td><td>B64F 5/00</td></tr>
<tr><td>WO</td><td>2015008308 A2</td><td>1/2015</td><td></td><td></td></tr>
<tr><td>WO</td><td>2019071327 A1</td><td>4/2019</td><td></td><td></td></tr>
</table>

OTHER PUBLICATIONS

Sankaralingam L et al: "A comprehensive 1-15 survey on the methods of angle of attack measurement and estimation in UAVs", Chinese Journal of Aeronautics, Elsevier, Amsterdam, NL, vol. 33, No. 3, Nov. 18, 2019 (Nov. 18, 2019), pp. 749-770, XP086138001.
Search Report dated Jul. 25, 2025 from the Office Action for Chinese Application No. 202380060166.X issued Jul. 28, 2025. 3 pages. (see p. 2-3, categorizing the cited references).

* cited by examiner

Uncorrected AIRSPEED

VERTICAL SPEED

PITCH ATTITUDE

Uncorrected ALTITUDE

AIRSPEED COMPARISON:
• Reference      (dashed line)
• Classic correction (dotted line)
• Regressor correction (solid line)

ALTITUDE COMPARISON:
• Reference      (dashed line)
• Classic correction (dotted line)
• Regressor correction (solid line)

AIR DATA INDICATING ARRANGEMENT AND METHOD FOR CALIBRATING THE SAME

CROSS-REFERENCE TO RELATED APPLICATIONS

The present application is a national phase entry under 35 U.S.C. § 371 of International Application No. PCT/EP2023/070450 filed Jul. 24, 2023, which claims priority from Switzerland Application No. 969/2022 filed Aug. 17, 2022.

TECHNICAL FIELD

The invention relates to an air data indicating arrangement for a vertical take-off and landing (VTOL) aircraft, in particular a helicopter, for providing information on an air speed of the vertical take-off and landing aircraft and for providing information on an altitude of the vertical take-off and landing aircraft. Thereby, the vertical take-off and landing aircraft includes a pitot tube device for determining a stagnation air pressure at a position of the pitot tube device and for providing pitot tube data including information on the stagnation air pressure at the position of the pitot tube device and a static port device for determining a static air pressure at a position of the static port device and for providing static port data including information on the static air pressure at the position of the static port device. Furthermore, the invention relates to a method for calibrating such an air data indicating arrangement.

BACKGROUND ART

Air data indicating arrangements pertaining to the technical field initially mentioned are known. They are included in so-called pitot-static systems implemented in vertical take-off and landing (VTOL) aircrafts. Such a pitot-static system measures with a pitot tube device arranged on the VTOL aircraft the stagnation air pressure at a position of the pitot tube device and measures with a static port device arranged on the VTOL aircraft the static air pressure at the position of the static port device. With the air data indicating arrangement, the air speed and the altitude of the respective VTOL aircraft is determined using pitot tube data including information on the stagnation air pressure measured with the pitot tube device at the position of the pitot tube device on the VTOL aircraft and using static port data including information on the static air pressure measured with the static port device at the position of the static port device on the VTOL aircraft. This air speed and altitude of the VTOL aircraft is then displayed to the pilot of the VTOL aircraft or data including information on this air speed and altitude of the VTOL aircraft are then forwarded to the autopilot of the VTOL aircraft for flying the VTOL aircraft automatically in autopilot mode.

These pitot-static systems are essential for the safety of VTOL aircrafts. In case the pilot is not aware of the correct air speed and the correct altitude or even relies on incorrect values of the air speed and the altitude of the VTOL aircraft, the pilot may try to fly maneuvers resulting a crash of the VTOL aircraft. In the same way, in case data including information on the incorrect air speed and/or on the incorrect altitude of the VTOL aircraft are forwarded to the autopilot of the VTOL aircraft, a crash of the VTOL aircraft may result.

For this reason, pitot-static systems need to reliably display the air speed and altitude of the VTOL aircraft to the pilot with a precision at least as precise as required by regulatory specifications. In order to achieve this, the air data indicating arrangements need to reliably determine the air speed and the altitude of the VTOL aircraft at least as precise as required by regulatory specifications and provide correct information on the air speed and the altitude of the VTOL aircraft.

However, in VTOL aircrafts, the stagnation air pressure at the position of the pitot tube device and the static air pressure at the position of the static port device not only depend on the actual air speed and the actual altitude of the VTOL aircraft but also depend on the current flight configuration and the current flight condition of the VTOL aircraft. More precisely, there are air flows and turbulences around the VTOL aircraft and thus where the pitot tube device and the static port device are arranged on the VTOL aircraft. These air flows and turbulences at the position of the pitot tube device and at the position of the static port device change with changing flight configuration and changing flight condition of the VTOL aircraft. Hence, at a given air speed and altitude of the VTOL aircraft, the stagnation air pressure measured with the pitot tube device and the static air pressure measured with the static port device depend on the current flight configuration and the current flight condition of the VTOL aircraft. Consequently, in order to provide the air speed and the altitude to the pilot of a VTOL aircraft with an acceptable precision, air data indicating arrangements for VTOL aircrafts must be calibrated.

Methods for calibrating air data indicating arrangements are for example described in the article "*GPS-BASED Airspeed Calibration for Rotocraft: Generalized Application for All Flight Regimes*" of Denis Hamel and Alex Kolarich presented on the Vertical Flight Society's 76th Annual Forum & Technology Display, Oct. 6-8, 2020, Virtual. This article relates to the calibration of pitot-static systems. Thereby, according to the article, the GPS-based true airspeed method with an adapted execution and analysis technic is identified as the most practical in terms of equipment and efficiency to provide a complete air speed system calibration.

However, there is no known calibration method which enables correcting the values of the air speed and the altitude determined with an air indicating arrangement for a VTOL aircraft for all flight configurations and flight conditions with the precision required by the regulatory specifications.

Besides these mentioned calibration issues, the stagnation air pressure at the position of the pitot tube device and the static air pressure at the position of the static port device also depend on the position where the pitot tube device and the static port device are located on the VTOL aircraft. For example, as a general observation, the closer the pitot tube device and the static port device are arranged to the fuselage of the VTOL aircraft, the stronger the stagnation air pressure measured with the pitot tube device and the static air pressure measured with the static port device deviate from the effective values of the stagnation air pressure and the static air pressure. Nonetheless, when designing a new type of VTOL aircraft including a pitot-static system, the pitot tube device and the static port device often have to be repeatedly repositioned because the deviations of the measured stagnation air pressure and the static air pressure deviate too strongly from the effective values of the stagnation air pressure and the static air pressure for being corrected by calibration with the required precision. This often leads to several design iterations where in each iteration, the air data indicating arrangement of the employed pitot-static system is newly calibrated after flying test flights with a prototype of the type of VTOL aircraft for verifying the pitot-static system's preciseness until a design of the VTOL aircraft and arrangement of the pitot tube device and the static port device on the VTOL aircraft is found which fulfils the requirements of the regulatory specifications with respect to the pitot-static system. Since these iterations are very time and cost intensive, it is of interest to reduce the number of iterations required. A known way to reduce the number of iterations is to place the pitot tube device and the static port device at locations with uncritical pressure fields, in particular far away from the fuselage of the VTOL aircraft. However, this has the disadvantage of being expensive and creating safety issues for the ground personnel.

SUMMARY OF THE INVENTION

It is the object of the invention to create an air data indicating arrangement pertaining to the technical field initially mentioned and a method for calibrating such an air data indicating arrangement, that enable the air data indicating arrangement to provide correct values of the air speed and the altitude for all flight configurations and flight conditions with the precision required by the regulatory specifications and which enable a cheaper and safer design procedure for designing an VTOL aircraft.

According to the invention, the air data indicating arrangement is connectable to the pitot tube device for receiving the pitot tube data provided by the pitot tube device and the air data indicating arrangement is connectable to the static port device for receiving the static port data provided by the static port device. Thereby, the air data indicating arrangement includes an air speed and altitude determination module, the air speed and altitude determination module being adapted to determine in real-time the air speed of the VTOL aircraft and the altitude of the VTOL aircraft from flight data by using a regressor obtained by training an artificial neural network with training data, wherein the flight data include at least the pitot tube data, the static port data, vertical speed data including information on a vertical speed of VTOL aircraft and pitch attitude angle data including information on a pitch attitude angle of the VTOL aircraft.

According to the invention, the air data indicating arrangement is for a vertical take-off and landing (VTOL) aircraft, in particular a helicopter. Thereby, it is irrelevant whether the VTOL aircraft or helicopter, respectively, is a manned aircraft or an unmanned aircraft. In case the VTOL aircraft or helicopter, respectively, is a manned aircraft, the pilot of the VTOL aircraft or helicopter, respectively, may be on board of the VTOL aircraft or helicopter, respectively, or may be on the ground in case the VTOL aircraft or helicopter, respectively, is remote controllable by a remote control. In case the VTOL aircraft or helicopter, respectively, is an unmanned aircraft, the VTOL aircraft or helicopter, respectively, is advantageously remote controllable by a remote control. In all these cases, the VTOL aircraft or helicopter, respectively, may as well include an autopilot which relies amongst others on a pitot-static system including an air data indicating arrangement according to the invention.

According to the invention, the air data indicating arrangement is for providing information on the air speed of the VTOL aircraft and for providing information on the altitude of the VTOL aircraft. Thus, the air data indicating arrangement is advantageously adapted for providing information on the air speed of the VTOL aircraft determined by the air speed and altitude determination module and adapted for providing information on the altitude of the VTOL aircraft determined by the air speed and altitude determination module. Thereby, in one example, the air data indicating arrangement includes a display for displaying the air speed and the altitude of the VTOL aircraft. In this example, the information on the air speed of the VTOL aircraft and the information on the altitude of the VTOL aircraft are provided by the air data indication arrangement by displaying the air speed and the altitude on the display. In another example, the air data indicating arrangement includes an output port for outputting output data including the information on the air speed of the VTOL aircraft and including the information on the altitude of the VTOL aircraft. In this other example, the output port may be connectable to an autopilot of the VTOL aircraft. Or, the output port may be connectable to some other device like for example to a board computer of the VTOL aircraft for transmitting the output data from the air data indicating arrangement to the board computer for displaying the air speed and altitude with a display controlled by the board computer. Or, in case the VTOL aircraft is remotely controllable by a remote control, the output port may be connectable to the remote control of the VTOL aircraft for transmitting the output data from the air data indicating arrangement to the remote control for displaying the air speed and altitude on the remote control. Thereby, the air data indicating arrangement can for example be located in the VTOL aircraft and transmit the output data to the remote control or can for example be located in the remote control and receive the pitot tube data and the static port data transmitted from the VTOL aircraft. In either variant with the output port, the information on the air speed of the VTOL aircraft and the information on the altitude of the VTOL aircraft are provided by the air data indicating arrangement in the form of the output data.

According to the invention, the air data indicating arrangement includes the air speed and altitude determination module, the air speed and altitude determination module being adapted to determine in real-time the air speed of the VTOL aircraft and the altitude of the VTOL aircraft from flight data by using a regressor obtained by training an artificial neural network with training data. In one example, the air speed and altitude determination module is a computer program product to be run on a computing unit like for example the control computer of the VTOL aircraft or another computing unit separate from the control computer of the VTOL aircraft. In another example, the air speed and altitude determination module is a computing unit adapted to determine in real-time the air speed of the VTOL aircraft and the altitude of the VTOL aircraft from flight data by using the regressor obtained by training the artificial neural network with training data.

Independent of whether the air speed and altitude determination module is a computer program product or a computing unit, the air speed and altitude determination module is adapted to determine in real-time the air speed of the VTOL aircraft and the altitude of the VTOL aircraft from the flight data by using the regressor obtained by training an artificial neural network with training data. Thereby, in operation of the air speed and altitude determination module, the flight data is advantageously fed to the regressor in real-time for determining in real-time the air speed of the VTOL aircraft and the altitude of the VTOL aircraft from the flight data. Thereby, in one example, the regressor outputs the air speed and altitude of the VTOL aircraft. In another example, the air speed and altitude of the VTOL aircraft are calculable by the air speed and altitude determination module from the output of the regressor. In the latter example, the output of the regressor can for example be a corrected stagnation air pressure and a corrected static air pressure, from which the air speed of the VTOL aircraft and the altitude of the VTOL aircraft are calculable by the air speed and altitude determination module.

According to the invention, the flight data includes at least the pitot tube data, the static port data, vertical speed data including information on a vertical speed of the VTOL aircraft and pitch attitude angle data including information on a pitch attitude angle of the VTOL aircraft.

Since the pitot tube data include information on the stagnation air pressure at the position of the pitot tube device, the pitot tube data can for example be the stagnation air pressure measured with the pitot tube device in any unit as outputted by the pitot tube device, the uncorrected air speed calculated based on the measured stagnation air pressure and the measured static air pressure, or the precorrected air speed. This precorrected air speed can for example be the uncorrected air speed corrected with a known position correction from a look up table.

Since the static port data include information on the static air pressure at the position of the static port, the static port data can for example be the static air pressure measured with the static port in any arbitrary unit as outputted by the static port, the uncorrected altitude calculated based on the measured static air pressure, or the precorrected altitude. This precorrected altitude can for example be the uncorrected altitude corrected with a known position correction from a look up table.

Since the vertical speed data includes information on the vertical speed of the VTOL aircraft, the vertical speed data can for example be obtained from the static port data by using the change of the static port data over time. This can for example be the change over time of the static air pressure measured with the static port in any arbitrary unit as outputted by the static port, the change over time of the uncorrected altitude calculated based on the measured static air pressure, or the change of over time the precorrected altitude. In either case, this can be the change per predefined time unit.

Since the pitch attitude angle data include information on the pitch attitude angle of the VTOL aircraft, the pitch attitude angle data can for example be obtained from an air data attitude and heading reference system (ADAHRS) of the VTOL aircraft, in particular from a gyroscopic flight instrument or a microelectrochemical system (MEMS) gyroscope. In order to receive the pitch attitude angle data, the flight data indicating arrangement is advantageously connectable to a pitch attitude angle data providing unit which provides the pitch attitude angle data. This pitch attitude angle data providing unit can for example be a gyroscopic flight instrument or a microelectrochemical system (MEMS) gyroscope. The pitch attitude angle data providing unit can however as well be a computer which receives the pitch attitude angle data from yet another unit or the mentioned gyroscopic flight instrument or microelectrochemical system (MEMS) gyroscope, respectively. Thereby, the pitch attitude angle data providing unit can for example be part of the air data attitude and heading reference system (ADAHRS) of the VTOL aircraft.

In the method according to the invention for calibrating an air data indicating arrangement according to the invention, the air speed and altitude determination module of the air data indicating arrangement is calibrated by obtaining the regressor by training the neural network with training data including training data sets in order to calibrate the air data indicating arrangement. Thereby, each training data set is related to a flight condition and includes flight data obtained during flying in the respective flight condition with a VTOL aircraft of a type of VTOL aircraft, in particular helicopter, for which type of VTOL aircraft the air data indicating arrangement is to be calibrated. Each training data set includes reference output data corresponding to the desired output of the regressor during flying in the respective flight condition with the VTOL aircraft of the respective type of VTOL aircraft, wherein the flight data includes at least pitot tube data obtained from the pitot tube device of the VTOL aircraft of the respective type of VTOL aircraft during flying in the respective flight condition with the VTOL aircraft of the respective type of VTOL aircraft, static port data obtained from the static port of the VTOL aircraft of the respective type of VTOL aircraft during flying in the respective flight condition with the VTOL aircraft of the respective type of VTOL aircraft, vertical speed data including information on a vertical speed of the VTOL aircraft of the respective type of VTOL aircraft during flying in the respective flight condition with the VTOL of the respective type of VTOL aircraft and pitch attitude angle data including information on a pitch attitude angle of the vertical VTOL aircraft of the respective type of VTOL aircraft during flying in the respective flight condition with the VTOL aircraft of the respective type of VTOL aircraft.

Thereby, advantageously, for each training data set, the flight data of the respective training data set has been obtained, advantageously recorded, simultaneously. Thus, advantageously, for each training data set, the flight data of the respective training data set has been obtained, advantageously recorded, during the same test flight with the VTOL aircraft of the respective type of VTOL aircraft during flying one maneuver in the respective flight condition. This has the advantage that for each training data set, the different types of data of the flight data belong together. The different training data sets of the training data may be obtained during the same test flight or may be obtained during different test flights. In the latter case of different test flights, the different training data sets of the training data are advantageously obtained with the same VTOL aircraft of the respective type of VTOL aircraft. However, the different training data sets of the training data may as well be obtained during different test flights with different VTOL aircrafts of the same type of VTOL aircraft.

In all these variants, for each training data set, the reference output data corresponding to the desired output of the regressor during flying in the respective flight condition with the VTOL aircraft of the respective type of VTOL aircraft and the flight data of the respective training data set can be obtained, or recorded respectively, simultaneously. The reference output data can however as well be obtained by calculation based on the flight data of the respective training data set.

Thus, the flight data and the reference output data can for example be recorded by measurement during one or more test flights with a VTOL aircraft of a particular type of VTOL aircraft, whereafter, the recorded flight data and the reference output data can be used to calibrate the air data indicating arrangement of the respective VTOL aircraft and to calibrate the air data indicating arrangement of further VTOL aircrafts of the respective type of VTOL aircrafts. In another example, the flight data are recorded by measurement while the reference output data are calculated from the flight data or recorded by measurement during one or more test flights for approving a particular VTOL aircraft, whereafter, the recorded flight data and the recorded or calculated reference output data are used to calibrate the air data indicating arrangement of the respective VTOL aircraft.

The air data indicating arrangement according to the invention and the method according to the invention for calibrating the air data indicating arrangement according to the invention have the advantage that they enable to quickly provide a calibrated air data indicating arrangement which provides correct values of the air speed and the altitude for all flight configurations and flight conditions with the precision required by the regulatory specifications. Thus, the solution according to the invention enables an increased safety in the operation of the VTOL aircraft because the pilot as well as the autopilot of the VTOL aircraft can be provided with correct air speed and altitude values of the VTOL aircraft in real-time. Furthermore, the air data indicating arrangement according to the invention and the method according to the invention for calibrating the air data indicating arrangement according to the invention enable a cheaper and safer design procedure for designing an VTOL aircraft with only few or even no iteration of rearrangement of the pitot tube device and the static port. Furthermore, the solution according to the invention enables the pitot tube device and the static port to be arranged closer to the fuselage of the VTOL aircraft than when employing a known air data indicating arrangement. Avoiding parts that protrude far from the fuselage, the risk of injury of personnel handling the aircraft is reduced. Additionally, the solution according to the invention enables an easy and simple implementation in existing VTOL aircrafts by using the existing pitot tube device and the existing static port of the respective VTOL aircraft, wherein the air data indicating arrangement can easily be calibrated after a test flight with the respective VTOL aircraft for obtaining the training data and after training the artificial neural network with the training data.

Preferably, the flight data include roll attitude angle data including information on a roll attitude angle of the VTOL aircraft. This has the advantage that the air data arrangement can be calibrated more precisely with the method for calibrating the air data arrangement. Since the roll attitude angle data include information on the roll attitude angle of the VTOL aircraft, the roll attitude angle data can for example be obtained from an air data attitude and heading reference system (ADAHRS) of the VTOL aircraft, in particular from a gyroscopic flight instrument or a microelectrochemical system (MEMS) gyroscope.

Alternatively, however, the flight data goes without roll attitude angle data. This has the advantage that the calibration of the air data arrangement is simpler and requires less computational power.

Advantageously, the flight data include angle of sideslip data including information on an angle of a sideslip of the VTOL aircraft. This has the advantage that the air data arrangement can be calibrated more precisely with the method for calibrating the air data arrangement. In a variant where an even more precise calibration of the air data arrangement is enabled, the flight data include the roll attitude angle data including information on the roll attitude angle of the VTOL aircraft and the angle of sideslip data including information on the angle of the sideslip of the VTOL aircraft. Since the angle of sideslip data include information on the angle of the sideslip of the VTOL aircraft, the angle of sideslip data can for example be obtained from dedicated sensors. For example, the sideslip angle can be calculated using dedicated sideslip sensors which make use of the total pressure measured at two further static ports, one pointing to the right and one pointing to the left from the VTOL aircraft.

Alternatively, however, the flight data goes without angle of sideslip data. This has the advantage that the calibration of the air data arrangement is simpler and requires less computational power.

Preferably, the flight data include lateral acceleration data including information on a lateral acceleration of the VTOL aircraft, in particular an amount of lateral acceleration of the VTOL aircraft. This has the advantage that the air data arrangement can be calibrated more precisely with the method for calibrating the air data arrangement. Since the lateral acceleration data include information on the lateral acceleration of the VTOL aircraft, the lateral acceleration data can for example be obtained from an air data attitude and heading reference system (ADAHRS) of the VTOL aircraft, in particular from one or more accelerometers.

In a first variant where an even more precise calibration of the air data arrangement is enabled, the flight data include the roll attitude angle data including information on the roll attitude angle of the VTOL aircraft and the lateral acceleration data including information on the lateral acceleration of the VTOL aircraft, in particular the amount of lateral acceleration of the VTOL aircraft. In a second variant where as well an even more precise calibration of the air data arrangement is enabled, the flight data include the lateral acceleration data including information on the lateral acceleration of the VTOL aircraft, in particular the amount of lateral acceleration of the VTOL aircraft, and the angle of sideslip data including information on the angle of the sideslip of the VTOL aircraft. In a third variant where an even more precise calibration of the air data arrangement is enabled, the flight data include the roll attitude angle data including information on the roll attitude angle of the VTOL aircraft, the angle of sideslip data including information on the angle of the sideslip of the VTOL aircraft and the lateral acceleration data including information on the lateral acceleration of the VTOL aircraft, in particular the amount of lateral acceleration of the VTOL aircraft.

Alternatively, however, the flight data goes without lateral acceleration data. This has the advantage that the calibration of the air data arrangement is simpler and requires less computational power.

Advantageously, a pitot-static system includes the air data indicating arrangement according to the invention, the pitot tube device and the static port.

Preferably, a vertical take-off and landing (VTOL) aircraft, in particular a helicopter, includes the air data indicating arrangement according to the invention. The VTOL aircraft advantageously includes additionally the pitot tube device and the static port. In this case, the VTOL aircraft advantageously includes the before mentioned pitot-static system including the air data indicating arrangement according to the invention. However, alternatively, the VTOL aircraft goes without the pitot tube device and without the static port. In either case where the VTOL aircraft includes the air data indicating arrangement according to the invention, the VTOL aircraft advantageously includes additionally a display for displaying the air speed of the VTOL aircraft from the information on the air speed of the VTOL aircraft received from the air data indicating arrangement and for displaying the altitude of the VTOL aircraft from the information on the altitude of the VTOL aircraft received from the air data indicating arrangement.

In an alternative to these variants, however, the air data indicating arrangement according to the invention goes separate from the mentioned pitot-static system and separate from the mentioned VTOL aircraft.

In case the VTOL aircraft is an unmanned aircraft, the air data indicating arrangement is advantageously part of a combination of the VTOL aircraft and a remote control for controlling the VTOL aircraft. In this case, the air data indicating arrangement can for example be arranged in the VTOL aircraft or in the remote control. In the latter case, the air data indicating arrangement is thus separate from the VTOL aircraft as it is arranged in the remote control.

Alternatively, the air data indicating arrangement can be produced and sold completely separate from the VTOL aircraft and separate from any remote control. Thereby, the air indicating arrangement can for example be adapted to be arranged in the VTOL aircraft or can be adapted to be arranged in the remote control.

Preferably, in the method for calibrating the air data indicating arrangement, in each training data set, the reference output data corresponding to the desired output of the regressor during flying in the respective flight condition with the VTOL aircraft of the type of VTOL aircraft is obtained from one or more reference sensors of the VTOL aircraft of the type of VTOL aircraft during flying in the respective flight condition. This has the advantage that the reference output data can be obtained in a reliable and comprehensible way. The one or more reference sensors are advantageously calibrated sensors arranged on the VTOL aircraft. The one or more reference sensors can thereby be sensors arranged on the VTOL aircraft only for purposes of obtaining the reference output data during the test flight when flying in the respective flight condition. After the test flight, the one or more reference sensors can be removed from the VTOL aircraft. In a variant, however, the one or more reference sensors are permanently installed on the VTOL aircraft.

It is irrelevant whether the reference output data is identical to the data outputted by the one or more reference sensors or whether the reference output data is calculated from the data outputted by the one or more reference sensors. In either case, the one or more reference sensors can for example be arranged on a nose boom of the VTOL aircraft or on a trailing bomb trailed behind the VTOL aircraft during the test flight for obtaining the reference output data. Such a nose boom and such a trailing bomb both enable arranging the one or more reference sensors far from the fuselage of the VTOL aircraft such that they provide as precise data as possible for obtaining the reference output data. Thereby, the obtained data is particular precise in case the one or more reference sensors are calibrated sensors.

Depending on what the desired output of the regressor during flying in the respective flight condition with the VTOL aircraft of the type of VTOL aircraft is, the reference output data can for example be obtained from air speed and pressure altitude sensors which already include corrections for the wind and turbulences effects, from dynamic pressure and static pressure altitude sensors which already include the corrections for the wind and turbulences effects, from total pressure and static pressure altitude sensors which already include corrections for the wind and turbulences effects, or from ground speed and rate of climb sensors like GPS and inertial units.

Alternatively, however the reference output data are obtained by calculation based on the flight data of the respective training data set or in another way. For example, the reference output data can be obtained by correcting the flight data using a GPS calibration method like the one described in the article "*GPS-BASED Airspeed Calibration for Rotocraft: Generalized Application for All Flight Regimes*" of Denis Hamel and Alex Kolarich presented on the Vertical Flight Society's 76th Annual Forum & Technology Display, Oct. 6-8, 2020, Virtual.

Advantageously, the training data include for at least one flight condition of a list of flight conditions at least one training data set related to the respective flight condition, wherein the list of flight conditions include level flight at a first level flight speed, climb at a first climb rate and a first climb flight speed and descent at a first descent rate and a first descent flight speed. Thereby, in a variant of a vertical climb, the first climb flight speed is 0 knots. Furthermore, in a variant of a vertical descent, the first decent flight speed is 0 knots. More advantageously, the training data include for each one of at least two of the list of flight conditions at least one training data set related to the respective flight condition. Even more advantageously, the training data include for each one of at least three of the list of the flight conditions at least one training data set related to the respective flight condition. Thereby, the more different flight conditions of the list of flight conditions to which related the training data include at least one training data set, the more precise the air data indicating arrangement can be calibrated.

The list of flight conditions advantageously further includes level flight at a second level flight speed, wherein the second level flight speed larger than the first level flight speed. Thereby, the training data advantageously include at least two training data sets, whereof one is related to the flight condition level flight at a first level flight speed and whereof one is related to the flight condition level flight at a second level flight speed. This has the advantage that the air data indicating arrangement can be calibrated more precisely. This precision can be further increased in case the first level flight speed and the second level flight speed are essentially equally spaced like for example 100 knots and 200 knots. However, the first level flight speed and the second level flight speed may be differently spaced, too.

Alternatively, the list of flight conditions does not include level flight at a second level flight speed, wherein the second level flight speed is larger than the first level flight speed.

The list of flight conditions advantageously further includes climb at a second climb rate and the first climb flight speed, wherein the second climb rate is larger than the first climb rate. Thereby, the training data advantageously include at least two training data sets, whereof one is related to the flight condition climb at the first climb rate at the first climb flight speed and whereof one is related to the flight condition climb at the second climb rate at the first climb flight speed. This has the advantage that the air data indicating arrangement can be calibrated more precisely. This precision can be further increased in case the first climb rate and the second climb rate are essentially equally spaced like for example 500 feet per minute and 1'000 feet per minute. However, the first climb rate and the second climb rate may be differently spaced, too.

The list of flight conditions advantageously includes climb at the first climb rate and a second climb flight speed, wherein the second climb flight speed is larger than the first climb flight speed. Thereby, the training data advantageously include at least two training data sets, whereof one is related to the flight condition climb at the first climb rate at the first climb flight speed and whereof one is related to the flight condition climb at the first climb rate at the second climb flight speed. This has the advantage that the air data indicating arrangement can be calibrated more precisely. This precision can be further increased in case the first climb flight speed and the second climb flight speed are essentially equally spaced like for example 50 knots and 100 knots.

However, the first climb flight speed and the second climb flight speed may be differently spaced, too.

The list of flight conditions advantageously further includes climb at the second climb rate and the second climb flight speed. This has the advantage that the air data indicating arrangement can be calibrated more precisely. This precision can be further increased in case the first climb flight speed and the second climb flight speed are essentially equally spaced like for example 50 knots and 100 knots. However, the first climb flight speed and the second climb flight speed may be differently spaced, too.

Alternatively, the list of flight conditions does not include climb at a second climb rate, wherein the second climb rate is larger than the first climb rate.

The list of flight conditions advantageously further includes descent at a second descent rate and the first descent flight speed, wherein the second descent rate is larger than the first descent rate. Thereby, the training data advantageously include at least two training data sets, whereof one is related to the flight condition descent at the first descent rate at the first descent flight speed and whereof one is related to the flight condition descent at the second descent rate and the first descent flight speed. This has the advantage that the air data indicating arrangement can be calibrated more precisely. This precision can be further increased in case the first descent rate and the second descent rate are essentially equally spaced like for example 700 feet per minute and 1'400 feet per minute. However, the first descent rate and the second descent rate may be differently spaced, too.

The list of flight conditions advantageously further includes descent at a third descent rate and the first descent flight speed, wherein the third descent rate is larger than the second descent rate. Thereby, the training data advantageously include at least three training data sets, whereof one is related to the flight condition descent at the first descent rate and the first descent flight speed, whereof one is related to the flight condition descent at the second descent rate and the first descent flight speed and whereof one is related to the flight condition descent at the third descent rate and the second descent flight speed. This has the advantage that the air data indicating arrangement can be calibrated even more precisely. This precision can be further increased in case the first descent rate, the second descent rate and the third descent are essentially equally spaced like for example 700 feet per minute, 1'400 feet per minute and 2'100 feet per minute. However, the first descent rate, the second descent rate and the third descent rate may be differently spaced, too.

The list of flight conditions advantageously includes descent at the first descent rate and a second descent flight speed, wherein the second descent flight speed is larger than the first descent flight speed. Thereby, the training data advantageously include at least two training data sets, whereof one is related to the flight condition descent at the first descent rate at the first descent flight speed and whereof one is related to the flight condition descent at the first descent rate and the second descent flight speed. This has the advantage that the air data indicating arrangement can be calibrated more precisely. This precision can be further increased in case the first descent flight speed and the second descent flight speed are essentially equally spaced like for example 50 knots and 100 knots. However, the first descent flight speed and the second descent flight speed may be differently spaced, too.

The list of flight conditions advantageously further includes descent at the second descent rate and the second descent flight speed. This has the advantage that the air data indicating arrangement can be calibrated more precisely. This precision can be further increased in case the first descent flight speed and the second descent flight speed are essentially equally spaced like for example 50 knots and 100 knots. However, the first descent flight speed and the second descent flight speed may be differently spaced, too.

The list of flight conditions advantageously further includes descent at the third descent rate and the second descent flight speed, wherein the third descent rate is larger than the second descent rate. Thereby, the training data advantageously include at least three training data sets, whereof one is related to the flight condition descent at the first descent rate and the second descent flight speed, whereof one is related to the flight condition descent at the second descent rate and the second descent flight speed and whereof one is related to the flight condition descent at the third descent rate and the second descent flight speed. This has the advantage that the air data indicating arrangement can be calibrated even more precisely.

Particular advantageously, the training data advantageously include at least six training data sets, whereof one is related to the flight condition descent at the first descent rate and the first descent flight speed, whereof one is related to the flight condition descent at the second descent rate and the first descent flight speed, whereof one is related to the flight condition descent at the third descent rate and the first descent flight speed, one is related to the flight condition descent at the first descent rate and the second descent flight speed, whereof one is related to the flight condition descent at the second descent rate and the second descent flight speed and whereof one is related to the flight condition descent at the third descent rate and the second descent flight speed. This has the advantage that the air data indicating arrangement can be calibrated even more precisely.

In a variant however, the list of flight conditions does not include descent at the third descent rate, wherein the third descent rate is larger than the seconds descent rate.

Independent of the descent flight speed, in case the list of flight conditions includes descent at the second descent rate or even includes descent at the third descent rate, the flight condition being a descent with the largest descent rate advantageously relates to an unpowered descent which is sometimes also referred to as autorotation descent, while the other one or more other flight conditions being a descent at a descent rate relate to a powered descent.

Alternatively, the list of flight conditions does not include descent at the second descent rate, wherein the second descent rate is larger than the first descent rate. Furthermore, the list of flight conditions can go without any descent at the second descent flight speed. Advantageously, the first level flight speed, the second level flight speed, the first climb rate, the second climb rate, the first climb flight speed, the second climb flight speed, the first descent rate, the second descent rate and the third descent rate, the first descent flight speed and the second descent flight speed mentioned above are constant. However, as outlined below, one or more of the first level flight speed, the second level flight speed, the first climb rate, the second climb rate, the first climb flight speed, the second climb flight speed, the first descent rate, the second descent rate, the third descent rate, the first descent flight speed and the second descent flight speed may vary over time in case an acceleration in either direction is applied in order to simulate a corresponding one of the flight configurations as outlined below.

Preferably, each training data set is related to a flight configuration and includes flight data obtained during flying in the respective flight configuration and in the flight condition to which flight condition the respective training data set is related to with the VTOL aircraft of the respective type of VTOL aircraft for which type of VTOL aircraft the air data indicating arrangement is to be calibrated, wherein the training data include at least one training data set related to at least one of the following list of flight configurations: mid center of gravity, longitudinal full forward center of gravity, longitudinal full afterward center of gravity, longitudinal slight forward center of gravity, longitudinal slight afterward center of gravity.

Thus, each training data set is advantageously related to one flight condition and to one flight configuration. Thereby, the flight condition is advantageously one of the above mentioned list of flight conditions, while the flight configuration is advantageously one of the above mentioned list of flight configurations.

Advantageously, the training data include for each one of at least two of the list of flight configurations at least one training data set related to the respective flight configuration. More advantageously, the training data include for each one of at least three of the list of flight configurations at least one training data set related to the respective flight configuration. Even more advantageously, the training data include for each one of at least four of the list of flight configurations at least one training data set related to the respective flight configuration. Most advantageously, the training data include for each one of the list of flight configurations at least one training data set related to the respective flight configuration.

In a more advantageous variant, the training data include for each flight condition for each one of at least two of the list of flight configurations at least one training data set related to the respective flight condition and related to the respective flight configuration. More advantageously, the training data include for each flight condition for each one of at least three of the list of flight configurations at least one training data set related to the respective flight condition and related to the respective configuration. Even more advantageously, the training data include for each flight condition for each one of at least four of the list of flight configurations at least one training data set related to the respective flight condition and related to the respective flight configuration. Most advantageously, the training data include for each flight condition for each one of the list of flight configurations at least one training data set related to the respective flight condition and related to the respective configuration.

In case the flight configuration is mid center of gravity, the VTOL aircraft may physically be configured in the mid center of gravity configuration or the VTOL aircraft may physically be configured in a different configuration like for examples a slight afterward center of gravity configuration and simulate the mid center of gravity configuration with flying at a constant forward acceleration to give the pitch attitude angle equal to the mid center of gravity configuration. This simulation of the mid center of gravity configuration can be achieved in all flight conditions of the above mentioned list of flight conditions.

In case the flight configuration is longitudinal full forward center of gravity, the VTOL aircraft may physically be configured in the longitudinal full forward center of gravity configuration or the VTOL aircraft may physically be configured in a different configuration like the mid center of gravity configuration and simulate longitudinal full forward center of gravity with flying at a constant forward acceleration that give the pitch attitude angle equal to the full forward center of gravity configuration. This simulation of the longitudinal full forward center of gravity configuration can be achieved in all flight conditions of the above mentioned list of flight conditions.

In case the flight configuration is longitudinal full afterward center of gravity, the VTOL aircraft may physically be configured in the longitudinal full afterward center of gravity configuration or the VTOL aircraft may physically be configured in a different configuration like the mid center of gravity configuration and simulate longitudinal full afterward center of gravity with flying at a constant backward acceleration that give the pitch attitude angle equal to the full afterward center of gravity configuration. This simulation of the longitudinal full afterward center of gravity configuration can be achieved in all flight conditions of the above mentioned list of flight conditions.

In case the flight configuration is longitudinal slight forward center of gravity, the VTOL aircraft may physically be configured in the longitudinal slight forward center of gravity configuration or the VTOL aircraft may physically be configured in a different configuration like the mid center of gravity configuration and simulate longitudinal slight forward center of gravity with flying at a constant forward acceleration that give the pitch attitude angle equal to the slight forward center of gravity configuration. This simulation of the longitudinal slight forward center of gravity configuration can be achieved in all flight configurations of the above mentioned list of flight conditions.

In case the flight configuration is longitudinal slight afterward center of gravity, the VTOL aircraft may physically be configured in the longitudinal slight afterward center of gravity configuration or the VTOL aircraft may physically be configured in a different configuration like the mid center of gravity configuration and simulate longitudinal slight afterward center of gravity with flying at a constant backward acceleration that give the pitch attitude angle equal to the slight afterward center of gravity configuration. This simulation of the longitudinal slight afterward center of gravity configuration can be achieved in all flight conditions of the above mentioned list of flight conditions.

Simulating one flight configuration of the list of flight configurations while the VTOL aircraft is physically configured in another flight configuration of the list of flight configurations has the advantage that the training data sets related to both flight configurations can be collected in one and the same test flight. Thus, particular advantageous, the training data is obtained or recorded, respectively, with the VTOL physically configured in one flight configuration of the list of flight configurations, like for example in the mid center of gravity configuration, while the other flight configurations of the list of flight configurations are simulated in order to obtain or record, respectively, the training data sets related to the other flight configurations of the list of flight configurations than the one in which the VTOL aircraft is physically configured in.

Alternatively to these variants, however, it is possible that the training data only includes training data sets related to one flight configuration, in particular one flight configuration of the list of flight configurations.

Advantageously, the regressor is a neural network regressor, in particular a fully connected neural network regressor, including an output layer.

Advantageously, the neural network regressor is a fully connected feed-forward neural network regressor. This has the advantage that the neural network regressor is simpler to handle because the information only travels forward in the network. In an alternative, however, the neural network regressor is a recurrent neural network regressor.

Advantageously, the output layer has a hyperbolic tangent (tanh) transfer function. This has the advantage that the output of the transfer function provides values between −1 and +1 which allows to apply a penalty to the node rather than just have the node not to fire. This gives a larger range of output and thus enables a more precise calibration of the air data indicating arrangement. Furthermore, the derivative of the hyperbolic tangent (tanh) is simple to calculate.

Alternatively, however, the output layer has a transfer function different from a hyperbolic tangent (tanh).

Advantageously, the regressor includes at least two hidden layers. This has the advantage that the air data indicating arrangement can be calibrated more precisely. Than in case the regressor includes only one hidden layer or even no hidden layer.

Alternatively, however, the regressor includes only one hidden layer or no hidden layer.

Preferably, the at least two hidden layers each contain at least 32 neurons, more preferably at least 60 neurons, most preferably at least 100 neurons. With the at least two hidden layers each containing at least 32 neurons, good calibration of the air data indicating arrangement can be achieved. However, the more neurons each of the at least two hidden layers contains, the more precise the achievable calibration of the air data indicating arrangement is. However, the more neurons each one of the at least two hidden layers contains, the more computational power is required for calibrating the air data indicating arrangement. Thus, advantageously, the at least two hidden layers each contain less than 300 neurons. Nonetheless, the at least two hidden layers each can alternatively contain less than 32 neurons, 300 neurons or even more than 300 neurons.

Preferably, the first one of the least two hidden layers has a relu transfer function. This has the advantage that it enables a reliable calibration of the air data indicating arrangement while requiring comparably little computational power.

Advantageously, every hidden layer of the at least two hidden layers except the last one of the at least two hidden layers has a relu transfer function. This has the advantage that it enables a reliable calibration of the air data indicating arrangement while requiring comparably little computational power. This advantage is particular pronounced in case the regressor includes more than two hidden layers.

Advantageously, every hidden layer of the at least two hidden layers has a relu transfer function. This has the advantage that a reliable calibration of the air data indicating arrangement while requiring comparably little computational power. In a variant however, the last one of the at least two hidden layers has a continuously differentiable transfer function, in particular a tanh transfer function. This has the advantage that a more precise calibration of the air data indicating arrangement is achievable.

In all the above mentioned variants with the relu transfer function, a transfer function which is different from the relu transfer function can be employed. For example, in a variation of the above mentioned variants with the relu transfer function, the transfer function is a gelu transfer function or a SiLu transfer function instead of a relu transfer function.

Advantageously, in each training data set, each type of the flight data (e.g. pitot tube data, static port data, etc.) is a value obtained by filtering a length of at least 0.5 seconds, particular advantageously at least 1 seconds, more advantageously at least 2 seconds, of a stream of data of the respective type of the flight data as measured in the respective flight condition, and, if applicable, in the respective flight configuration. This has the advantage that each training data set carries a reliable and representative number for each type of the flight data representing the flight condition and flight configuration to which the respective training data set is related to. In a preferred variation of these variants, in each training data set, each type of the flight data (e.g. pitot tube data, static port data, etc.) is a value obtained by filtering a length of 10 seconds or less, of a stream of data of the respective type of the flight data as measured in the respective flight condition, and, if applicable, in the respective flight configuration.

Thereby, when filtering the stream of data in order to obtain the respective value of the respective type of the flight data, the applied filter is in one example the average value of the data stream of the respective type of flight data calculated over the filtered length of the data stream. In another example, the applied filter is a low pass filter applied to the data stream of the respective type of flight data over the filtered length of the data stream, wherein the output value of the low pass filter is for example the value at 2 Hz.

In one alternative, in each training data set, the data of each type of the flight data (e.g. pitot tube data, static port data, etc.) is a value obtained by filtering a length of less than 0.5 seconds or more than 10 seconds of the stream of data of the corresponding type of the flight data as measured in the respective flight condition, and, if applicable, in the respective flight configuration. In another alternative, in the training data sets do not each include for the data of each type of the flight data a value obtained by filtering of the stream of data of the respective type of the flight data.

Advantageously, the calibration is verified with further training data. This has the advantage that the safety of the calibration can be controlled. In order to achieve this, advantageously about 80% to 90% of the training data is used for calibration while the remaining about 20% to 10% of the training data is used for the verification.

Alternatively, however, the method goes without such a verification.

Other advantageous embodiments and combinations of features come out from the detailed description below and the entirety of the claims.

BRIEF DESCRIPTION OF THE DRAWINGS

The drawings used to explain the embodiments show.

In the figures, the same components are given the same reference symbols.

PREFERRED EMBODIMENTS

Figure 1:
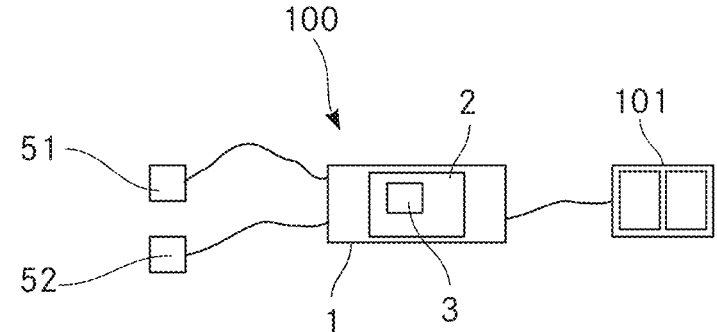
FIG. 1 a simplified schematic view of a pitot-static system for a vertical take-off and landing (VTOL) aircraft, in particular a helicopter, for indicating an air speed of the VTOL aircraft and an altitude of the VTOL aircraft to the pilot of the VTOL aircraft, the pitot-static system including an air data indicating arrangement according to the invention, FIG. 2 a simplified schematic side view of front part of a helicopter as an example of a VTOL aircraft with the air data indicating arrangement according to the invention, FIG. 3a, b the data recorded during two test flights with the helicopter, from which data the training data has been obtained used for calibrating the air data indicating arrangement according to the invention with the method according to the invention, FIG. 4 the data recorded during a third test flight for verifying the calibration of the air data indicating arrangement according to the invention, and FIG. 5 detailed views of the data during three maneuvers flown during the third test flight in order to illustrate in more detail how well the method according to the invention and the air data indicating arrangement according to the invention work.

FIG. 1 shows a simplified schematic view of a pitot-static system 100 for a vertical take-off and landing (VTOL) aircraft, in particular a helicopter, for indicating an air speed of the VTOL aircraft and an altitude of the VTOL aircraft to the pilot of the VTOL aircraft. This pitot-static system 100 includes a pitot tube device 51 for determining a stagnation air pressure at a position of the pitot tube device 51 and for providing pitot tube data including information on the stagnation air pressure at the position of the pitot tube device 51. Furthermore, the pitot-static system 100 includes a static port device 52 for determining a static air pressure at a position of the static port device 52 and for providing static port data including information on the static air pressure at the position of the static port device 52. Additionally, the pitot-static system 100 includes an air data indicating arrangement 1 according to the invention for a VTOL aircraft, in particular a helicopter, for providing information on the air speed of the VTOL aircraft and for providing information on the altitude of the VTOL aircraft. The pitot-static system 100 further includes a display 101 for displaying the air speed of the VOTL aircraft and the altitude of the VTOL aircraft and thus for indicating the airspeed and the altitude of the VTOL aircraft to the pilot of the VTOL aircraft.

When the pitot-static system 100 is implemented in the VTOL aircraft, the pitot-static system is included in the air data attitude and heading reference system (ADAHRS) of the VTOL aircraft. Thereby, the pitot tube device 51 and the static port device 52 of the pitot-static system 100 are mounted on the VTOL aircraft and thus belong to the VTOL aircraft. Furthermore, the display 101 is arranged to display the airspeed and the altitude of the VTOL aircraft to the pilot of the VTOL aircraft. Thereby, in case the pilot is supposed to sit in the cockpit of the VTOL aircraft, the display 101 is arranged in the cockpit of the VTOL aircraft and thus belongs to the VTOL aircraft. In case the VTOL aircraft is remote controllable, however, the display 101 may be arranged in the remote control for controlling the VTOL aircraft. In this case, the display belongs to the remote control.

When the pitot-static system 100 is implemented in the VTOL aircraft, the air data indicating arrangement 1 is connected to the pitot tube device 51 for receiving the pitot tube data provided by the pitot tube device 51 and is connected to the static port device 52 for receiving the static port data provided by the static port device 52. Furthermore, the air data indicating arrangement 1 is connected to the display 101 for providing the information on the air speed of the VTOL aircraft and the information on the altitude of the VTOL aircraft to the display 101 for being displayed to the pilot by the display 101. Thereby, the air data indicating arrangement 1 can for example be arranged in the VTOL aircraft and thus be part of the VTOL aircraft or, in case the VTOL aircraft is remote controllable, the air data indicating arrangement 1 can be arranged in the remote control. In either case, in case the VTOL aircraft provides an autopilot for automatically flying the VTOL aircraft, the air data indicating arrangement 1 is connected to the autopilot for providing the information on the air speed of the VTOL aircraft and the information on the altitude of the VTOL aircraft to the autopilot of the VTOL aircraft.

The air data indicating arrangement 1 according to the invention can be produced and sold separate from the VTOL aircraft and separate from the pitot-static system 100. However, since the air data indicating arrangement 1 can be part of the VTOL aircraft and can be part of the pitot-static system 100 as described above, the air data indicating arrangement 1 is connectable to the pitot tube device 51 for receiving the pitot tube data provided by the pitot tube device 51 and connectable to the static port device 52 for receiving the static port data provided by the static port device 52.

According to the invention, the air data indicating arrangement 1 includes an air speed and altitude determination module 2. This air speed and altitude determination module 2 is adapted to determine in real-time the air speed of VTOL aircraft and the altitude of the VTOL aircraft from flight data by using a regressor 3 obtained by training an artificial neural network with training data. In one example, the air speed and altitude determination module 2 is a computer program product to be run on a computing unit like for example the control computer of the VTOL aircraft or another computing unit separate from the control computer of the VTOL aircraft. In another example, the air speed and altitude determination module 2 is a computing unit like a computer on board of the VTOL aircraft or incorporated in a remote control, the computing unit being adapted to determine in real-time the air speed of the VTOL aircraft and the altitude of the VTOL aircraft from flight data by using the regressor 3 obtained by training the artificial neural network with training data.

The flight data includes at least the pitot tube data, the static port data, vertical speed data including information on a vertical speed of the VTOL aircraft and pitch attitude angle data including information on a pitch attitude angle of the VTOL aircraft.

Since the pitot tube data include information on the stagnation air pressure at the position of the pitot tube device 51, the pitot tube data can for example be the stagnation air pressure measured with the pitot tube device 51 in any unit as outputted by the pitot tube device 51, the uncorrected air speed calculated based on the measured stagnation air pressure and the measured static air pressure, or the precorrected air speed. This precorrected air speed can for example be the uncorrected air speed corrected with a known position correction from a look up table.

Since the static port data include information on the static air pressure at the position of the static port device 52, the static port data can for example be the static air pressure measured with the static port device 52 in any arbitrary unit as outputted by the static port device 52, the uncorrected altitude calculated based on the measured static air pressure, or the precorrected altitude. This precorrected altitude can for example be the uncorrected altitude corrected with a known position correction from a look up table.

Since the vertical speed data includes information on the vertical speed of the VTOL aircraft, the vertical speed data can for example be obtained from the static port data by using the change of value of the static port data over time. This can for example be the change over time of the static air pressure measured with the static port device 52 in any arbitrary unit as outputted by the static port device 52, the change over time of the uncorrected altitude calculated based on the measured static air pressure, or the change of over time the precorrected altitude. In either case, this can be the change per predefined time unit.

Since the pitch attitude angle data include information on the pitch attitude angle of the VTOL aircraft, the pitch attitude angle data can for example be obtained from the air data attitude and heading reference system (ADAHRS) of the VTOL aircraft, in particular from a gyroscopic flight instrument or a microelectrochemical system (MEMS) gyroscope. In order to receive the pitch attitude angle data, the flight data indicating arrangement 1 is advantageously connectable to a pitch attitude angle data providing unit which provides the pitch attitude angle data. This pitch attitude angle data providing unit can for example be a gyroscopic flight instrument or a microelectrochemical system (MEMS) gyroscope. The pitch attitude angle data providing unit can however as well be a computer which receives the pitch attitude angle data from yet another unit or the mentioned gyroscopic flight instrument or microelectrochemical system (MEMS) gyroscope, respectively. Thereby, the pitch attitude angle data providing unit can for example be part of the air data attitude and heading reference system (ADAHRS) of the VTOL aircraft.

In a variant, the flight data include furthermore roll attitude angle data include information on a roll attitude angle of the VTOL aircraft. Since the roll attitude angle data include information on the roll attitude angle of the VTOL aircraft, the roll attitude angle data can for example be obtained from an air data attitude and heading reference system (ADAHRS) of the VTOL aircraft, in particular from a gyroscopic flight instrument or a microelectrochemical system (MEMS) gyroscope. In order to receive the roll attitude angle data, the flight data indicating arrangement is advantageously connectable to a roll attitude angle data providing unit which provides the roll attitude angle data. Thereby, the roll attitude angle data providing unit can be the same unit as the before mentioned pitch attitude angle data providing unit or can be separate from the before mentioned pitch attitude angle data providing unit. The roll attitude angle data providing unit can for example be a gyroscopic flight instrument or a microelectrochemical system (MEMS) gyroscope. The roll attitude angle data providing unit can however as well be a computer which receives the roll attitude angle data from yet another unit or the mentioned gyroscopic flight instrument or microelectrochemical system (MEMS) gyroscope, respectively. Thereby, the roll attitude angle data providing unit can for example be part of the air data attitude and heading reference system (ADAHRS) of the VTOL aircraft.

In a further variant, the flight data further include angle of sideslip data including information on an angle of a sideslip of the VTOL aircraft. In a variant where an even more precise calibration of the air data arrangement is enabled, the flight data include the roll attitude angle data including information on the roll attitude angle of the VTOL aircraft and the angle of sideslip data including information on the angle of the sideslip of the VTOL aircraft. Since the angle of sideslip data include information on the angle of the sideslip of the VTOL aircraft, the angle of sideslip data can for example be obtained from dedicated sensors. For example, the sideslip angle can be calculated using dedicated sideslip sensors which make use of the total pressure measured at two further static ports, one pointing to the right and one pointing to the left from the VTOL aircraft.

In yet a further variant, the flight data further include lateral acceleration data including information on a lateral acceleration of the VTOL aircraft, in particular an amount of lateral acceleration of the VTOL aircraft. Since the lateral acceleration data include information on the lateral acceleration of the VTOL aircraft, the lateral acceleration data can for example be obtained from an air data attitude and heading reference system (ADAHRS) of the VTOL aircraft, in particular from one or more accelerometers. In order to receive the lateral acceleration data, the flight data indicating arrangement is advantageously connectable to a lateral acceleration data providing unit which provides the lateral acceleration data.

In a variant where an even more precise calibration of the air data arrangement is enabled, the flight data include the roll attitude angle data including information on the roll attitude angle of the VTOL aircraft and the lateral acceleration data including information on the lateral acceleration of the VTOL aircraft, in particular the amount of lateral acceleration of the VTOL aircraft. In a further variant where as well an even more precise calibration of the air data arrangement is enabled, the flight data include the lateral acceleration data including information on the lateral acceleration of the VTOL aircraft, in particular the amount of lateral acceleration of the VTOL aircraft, and the angle of sideslip data including information on the angle of the sideslip of the VTOL aircraft. In a third variant where an even more precise calibration of the air data arrangement is enabled, the flight data include the roll attitude angle data including information on the roll attitude angle of the VTOL aircraft, the angle of sideslip data including information on the angle of the sideslip of the VTOL aircraft and the lateral acceleration data including information on the lateral acceleration of the VTOL aircraft, in particular the amount of lateral acceleration of the VTOL aircraft.

Figure 2:
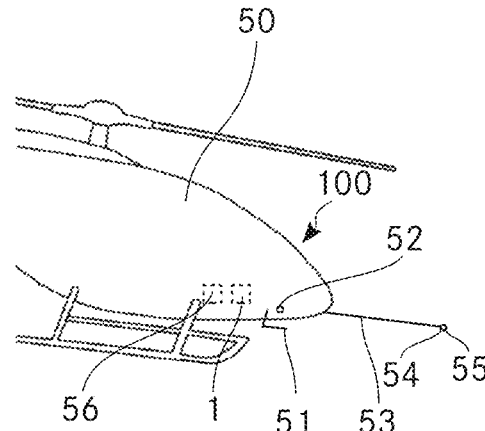

FIG. 2 shows a simplified schematic side view of front part of a helicopter 50 as an example of a VTOL aircraft with the air data indicating arrangement 1 according to the invention. This helicopter 50 has the pitot-static system 100 installed and thus comprises the air data indicating arrangement 1 according to the invention. Thereby, the pitot tube device 51 is installed on the right hand side of the front part of the helicopter 50, while on each side of the front part of the helicopter, a static port device 52 is installed. These static port devices 52 are interconnected. Both the pitot tube device 51 and the static port devices 52 are arranged and positioned as known in the art. The pitot tube device 51 is for determining the stagnation air pressure at the position of the pitot tube device 51 and for providing pitot tube data including information on the stagnation air pressure at the position of the pitot tube device 51. The interconnected static port devices 52 are for determining the static air pressure at a position of the static port devices 52 and for providing static port data including information on the static air pressure at the position of the static port devices 52. The air data indicating arrangement 1 is connected to the pitot tube device 51 for receiving the pitot tube data provided by the pitot tube device 51 and connected to the static port devices 52 for receiving the static port data provided by the static port devices 52. Furthermore, the air data indicating arrangement 1 is adapted to obtain the vertical speed data including the information on the vertical speed of the helicopter from the static port data by determining the change of the static port data over time.

The helicopter 50 further includes an air data attitude and heading reference system (ADAHRS) 56 as known in the art. The air data indicating arrangement 1 is connected to this ADAHRS 56 for receiving the pitch attitude angle data determined and provided by the ADAHRS 56.

In the helicopter 50, the air data indicating arrangement 1 is connected to the display 101 (not shown in FIG. 2) of the pitot-static system 100 for providing the information on the air speed and the information on the altitude of the helicopter 50 to the display 101 for displaying with the display 101 the air speed and the altitude to the pilot of the helicopter 50.

Furthermore, the air data indicating arrangement 1 is connected to the autopilot of the helicopter 50 for providing the information on the air speed and the information on the altitude of the helicopter 50 to the autopilot. The helicopter 50 shown in FIG. 2 can thus be flown with the air data indicating arrangement 1 calibrated with the method according to the invention both by the pilot and by the autopilot.

In order to obtain the reference output data of the training data during test flights, the helicopter 50 had a nose boom 53 installed as shown in FIG. 2. On the tip of this nose boom 53, a reference pitot tube device 54 and a reference static port device 55 were installed. Due to the nose boom 53, the reference pitot tube device 54 and the reference static port device 55 were installed far distanced from the fuselage of the helicopter 50 in uncritical pressure fields in order to minimise effects of wind flows and turbulence around the helicopter 50 which falsify the stagnation air pressure and the static air pressure measured with the reference pitot tube device 54 and the reference static port device 55. From the data obtained from the reference pitot tube device 54 and the reference static port device 55, the corrected reference air speed was calculated as known in the art while from the reference static port device 55, the corrected reference static air pressure was calculated as known in the art. Both the corrected reference air speed and the corrected reference static air pressure thus are calibrated as known in the art. Since the reference pitot tube device 54 and the reference static port device 55 were arranged on the tip of the nose boom 53 and since they were calibrated as known in the art, it was known that they provide for all flight configurations and flight conditions values well within the precision required by the regulatory specifications. Instead of arranging the reference pitot tube device 54 and the reference static port device 55 on the tip of the nose boom 53, they could also have been installed in a trailing bomb for obtaining the reference output data. This would as well have provided reference output data well within the precision required by the regulatory specifications.

Figure 3A:
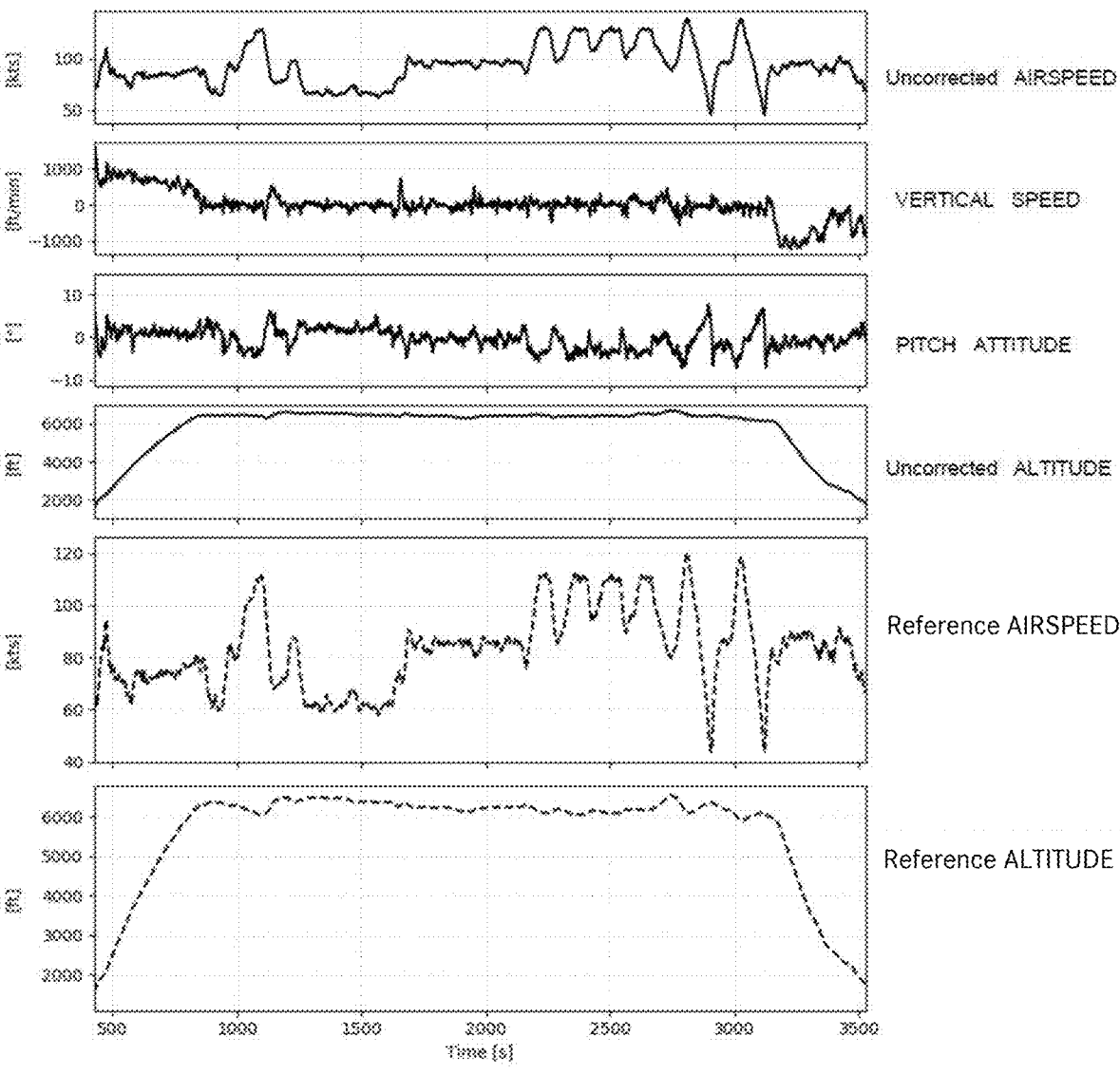
Figure 3B:
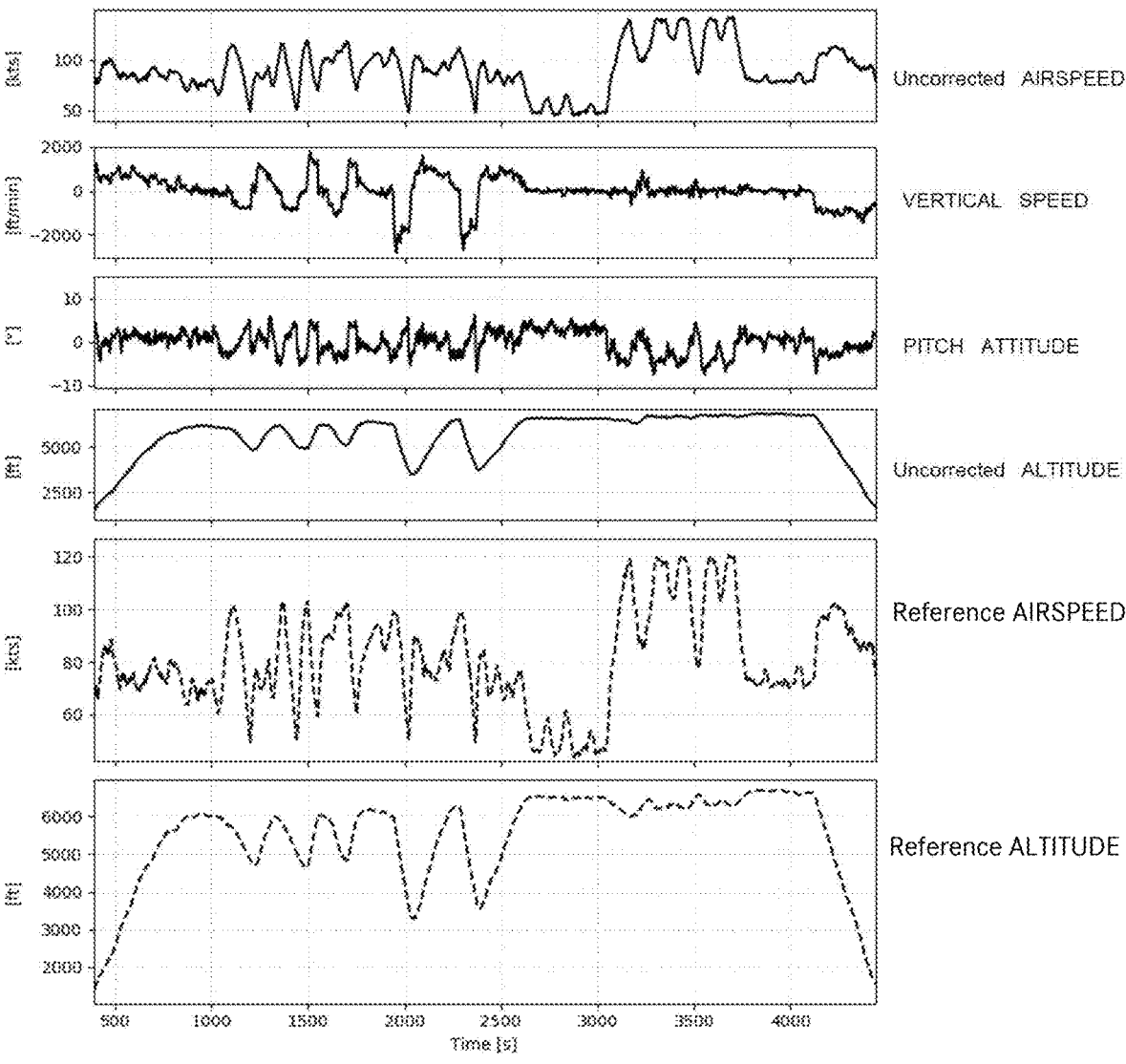

The training data for training the neural network for obtaining the regressor 3 in order to calibrate the air data indicating arrangement 1 has been obtained with the helicopter 50 by flying the helicopter 50 in two test flights. The data recorded during these two test flights is illustrated in FIGS. 3*a* and 3*b*. The flight data of the training data includes the pitot tube data, the static port data, the vertical speed data including the information on the vertical speed of the helicopter 50 and the pitch attitude angle data including the information on the pitch attitude angle of the helicopter 50. These flight data have been obtained as described already from the pitot tube device 51, the static port devices 52 and the ADAHRS 56. In the embodiment shown here, the flight data does not include the roll attitude angle data, does not include the sideslip data and does not include the lateral acceleration data. When adding one, two or all three of the roll attitude angle data, the sideslip data and the lateral acceleration data to the flight data, the calibration of the air indicating arrangement 1 becomes even more precise than shown here in the present example.

FIG. 3*a* shows the data recorded during the first of the two test flights with the helicopter 50, while FIG. 3*b* shows the data recorded during the second of the two test flights with the helicopter 50, from which data the training data has been obtained. In both FIGS. 3*a* and 3*b*, the six charts show the data recorded during the respective test flight in dependence of the time in seconds of the respective test flight.

In both FIGS. 3*a*, 3*b*, the top chart shows the uncorrected air speed in knots calculated from the pitot tube data and the static port data obtained from the pitot tube device 51 and the static port devices 52 with the formula $$IAS = \sqrt{\frac{2\gamma}{\gamma-1}\frac{p_{SSL}}{\rho_{SSL}}\left[\left(\frac{p_{t\_e}-p_{s\_e}}{p_{SSL}}+1\right)^{\frac{\gamma-1}{\gamma}}-1\right]}.$$

Thereby, IAS is the uncorrected air speed shown in the chart, while $p_{SSL}$ is the standard sea level pressure $p_{SSL}=101325$ Pa, $\rho_{SSL}$ the standard sea level air density $\rho_{SSL}=1.225$ kg/m$^3$, $\gamma$ the air ratio of specific heats $\gamma=1.4$, $p_{t\_e}$ the uncorrected stagnation air pressure obtained from the pitot tube device 51 and the $p_{s\_e}$ the uncorrected static air pressure obtained from the static port devices 52.

In both FIGS. 3*a*, 3*b*, the second chart shows the vertical speed in feet per minute calculated from the uncorrected static air pressure. Furthermore, in both Figures, the third chart shows the pitch attitude angle data obtained from the ADAHRS 56, while the fourth chart shows the uncorrected altitude in feet calculated from the static air pressure obtained from the static port devices 52. Thereby, the uncorrected altitude was calculated from the static air pressure $p_{s\_e}$ obtained from the static port devices 52 with the formula $$\text{uncorrected altitude} = \frac{T_{SSL}}{a}\left[1-\left(\frac{p_{s\_e}}{p_{SSL}}\right)^{\frac{a\cdot g_c\cdot R}{g}}\right],$$

wherein $p_{SSL}$ is again the standard sea level pressure $p_{SSL}=101325$ Pa, while a is the standard sea level laps rate a=0.001982 K/ft, $g_c$=32.17 lbm/slug, g the gravitational acceleration g=31.174049 ft/sec$^2$, and R=96.0340 (ft·lbf)/(lbm·K).

In both FIGS. 3*a*, 3*b*, the two lowest charts show the corrected reference air speed in knots and the corrected reference altitude in feet, respectively obtained from the reference pitot tube device 54 and the reference static port device 55 on the nose boom 53 of the helicopter 50. Thereby, the corrected reference air speed and the corrected reference altitude have been verified by a known GPS calibration method. In this GPS calibration method, ideally, only GPS data recorded from a flight in the absence of wind, once corrected for air density, together with the vertical speed, are used as the calibrated datum. In the present case however, in the case of wind, the GPS quasi-static Head and Tail wind method (quasi-static GPS) method has been applied to remove the effects of wind. This method is described for example in the initially mentioned publication "GPS-BASED Airspeed Calibration for Rotorcraft: Generalized Application for All Flight Regimes" of Denis Hamel and Alex Kolarich, Presented at the Vertical Flight Society's 76th Annual Forum & Technology Display, Oct. 6-8, 2020, Virtual.

During both test flights, the helicopter 50 was physically in the mid center of gravity configuration. During the test flights, different maneuvers like level flight at different constant air speeds, climb at different constant climb rates, descent at different descent rates up to an unpowered descent in autorotation where flown. Furthermore, these maneuvers were flown in different forward accelerations and different backward accelerations in order to simulate different flight configurations with different center of gravity up to the longitudinal full forward center of gravity configuration and the longitudinal full afterward center of gravity configuration. This way, the entire envelope of flight conditions and flight configurations was flown. Attention was paid to cover at least two equally distanced climb rates and at least three equally distanced descent rates, with the fastest descent rate being autorotation, while the slower descent rates are flown in a powered descent flight.

From the data shown in FIGS. 3*a* and 3*b*, in total 6400 training data sets were automatically extracted. For each training data set, the flight data and the corresponding reference output data was extracted by averaging for each type of data the data stream over a length of 2 seconds. Thus, in each training data set, each type of the flight data (i.e. the pitot tube data, the static port data, the vertical speed data and the pitch attitude angle data) as well as each type of reference output data (i.e. the reference air speed and the reference static pressure) is one value obtained by filtering by averaging a length of 2 seconds of the stream of data of the respective type of the flight data as measured in the respective flight condition and respective flight configuration. Thereby, the time windows with the length of 2 seconds of adjacent training data sets overlapped by 50%. Alternatively to this example, the time window over which the data stream of each type of data has been filtered by averaging can be chosen different from 2 seconds. As examples, this time window can be chosen to be 0.5 seconds, 5 seconds or 10 seconds. Furthermore, instead of filtering the data stream of each type of data by averaging another filtering method like for example a low pass filtering can be employed.

With the described training data, the regressor 3 was trained in order to calibrate the air speed and altitude determination module 2 in order to calibrate the air data indicating arrangement 1. The regressor 3 is a fully connected neural network regressor including two hidden layers and an output layer. The transfer function of the two hidden layers is a relu transfer function while the transfer function of the output layer is a hyperbolic tangent (tanh) function. Each one of the two hidden layers comprises 256 neurons. The regressor 3 used for calculating the corrected air speed (CAS) can be represented the formula $$CAS = \tanh(C_3 \cdot relu(C_2 \cdot relu(C_1 \cdot X + I_1) + I_2) + I_3),$$

where $C_1$, $C_2$ and $C_3$ are matrices with the weights for first hidden layer, second hidden layer and the output layer, respectively, and $I_1$, $I_2$ and $I_3$ are constant vectors of the first hidden layer, the second hidden layer and the output layer, respectively.

With the air data indicating arrangement 1 calibrated as described by training the regressor 3 with the training data. A third test flight was undertaken with the helicopter 50 for verifying the calibration of the air data indicating arrangement 1. Thereby, the helicopter 50 was again physically in the mid center of gravity configuration. During the test flights, different maneuvers like level flight at different constant air speeds, climb at different constant climb rates, descent at different descent rates up to an unpowered descent in autorotation where flown. Furthermore, these maneuvers were flown with different forward accelerations and different backward accelerations in order to simulate different flight configurations with different center of gravity up to the longitudinal full forward center of gravity configuration and the longitudinal full afterward center of gravity configuration. This way, the entire envelope of flight conditions and flight configurations was flown.

Figure 4:
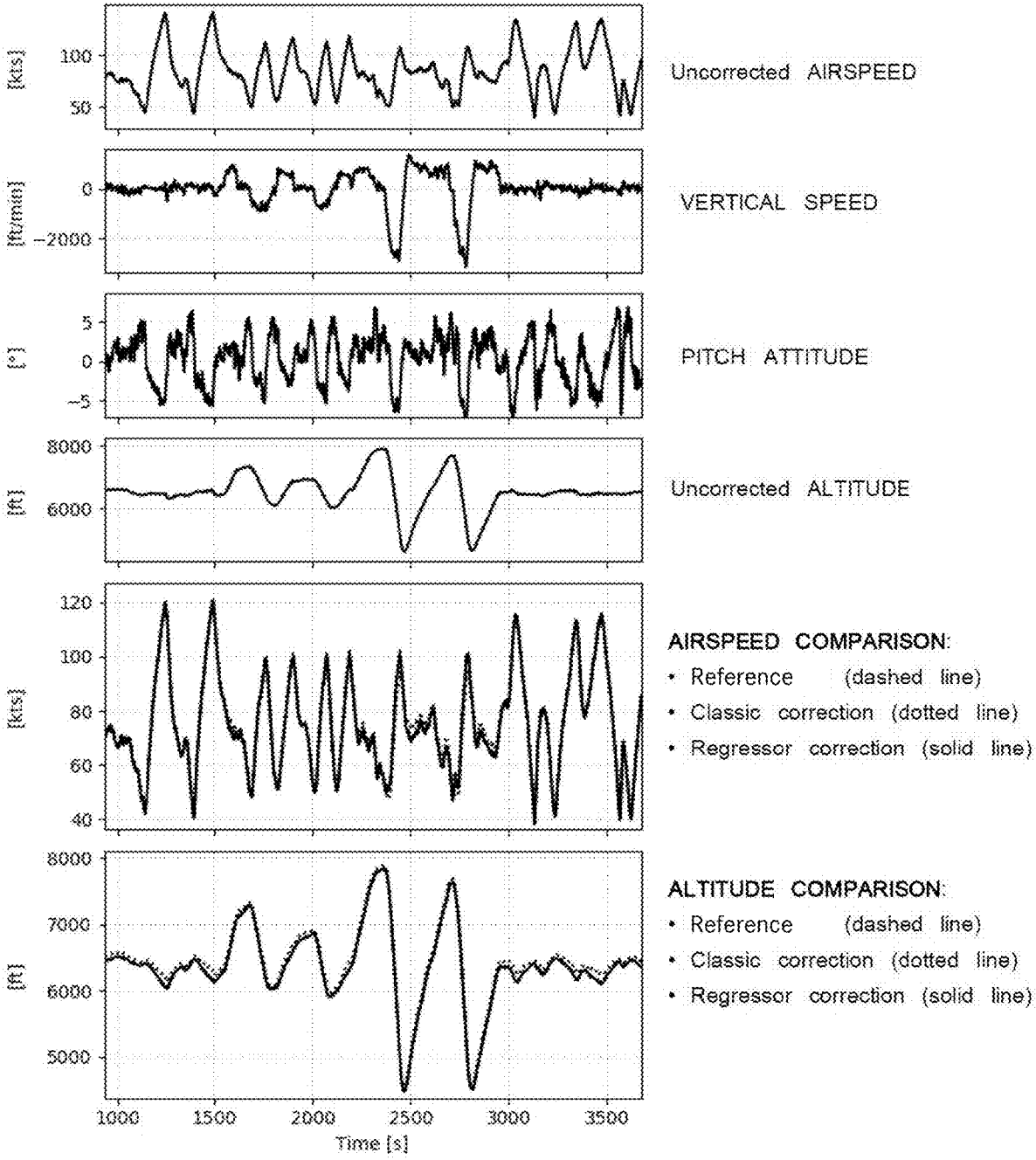

The data recorded during this third test flight is shown in FIG. 4. Thereby, FIG. 4 shows six charts showing the data recorded during the third test flight in dependence of the time in seconds of the third test flight in a similar arrangement as shown in the FIGS. 3*a* and 3*b* for the first two test flights. The top chart shows the uncorrected air speed in knots calculated from the pitot tube data and the static port data obtained from the pitot tube device 51 and the static port devices 52 in the same way as in FIGS. 3*a* and 3*b*. Furthermore, the second chart shows the vertical speed in feet per minute calculated from the uncorrected static air pressure, while the third chart shows the pitch attitude angle data obtained from the ADAHRS 56, while the fourth chart shows the uncorrected altitude in feet calculated from the static air pressure obtained from the static port devices 52 in the same way as shown in FIGS. 3*a* and 3*b*.

In contrast to FIGS. 3*a*, 3*b*, FIG. 4 however shows in the two lowest charts a comparison of the air speed in knots determined in different ways and the comparison of the altitude in feet determined in different ways, respectively. Thereby, the dashed lines are the corrected reference air speed and the corrected reference altitude in feet, respectively, obtained from the reference pitot tube device 54 and the reference static port device 55 on the nose boom 53 of the helicopter 50 as known in the art. Thus, these dashed lines correspond to the reference output data of the third test flight. It is known that the values of these dashed lines are well within the precision required by the regulatory specifications. The dotted lines are the air speed corrected with a classical GPS-based correction method as known in the art and the altitude corrected with a classical GPS-based correction method as known in the art, respectively, both calculated from the pitot tube data from the pitot tube device 51 and the static port data from the static port devices 52 and corrected with a look up table. Thereby, a correction according to the GPS-based calibration method described in in the initially mentioned publication "*GPS-BASED Airspeed Calibration for Rotocraft: Generalized Application for All Flight Regimes*" of Denis Hamel and Alex Kolarich, Presented at the Vertical Flight Society's 76th Annual Forum & Technology Display, Oct. 6-8, 2020, Virtual, has been used. Thus, the dotted lines serve for comparison with known classical correction methods. The solid lines are the air speed determined with the calibrated air data indicating arrangement 1 and thus determined with the help of the trained regressor 3 and the altitude determined with the calibrated air data indicating arrangement 1. Thus, the solid lines have been determined as described above from the flight data including the pitot tube data from the pitot tube device 51, the static port data from the static port devices 52, the vertical speed data and the pitch attitude angle data with the help of the trained regressor 3.

As can be seen from FIG. 4, in the lowest two charts, the solid lines (from the calibrated air data indicating arrangement 1) and the dashed lines (reference output data) correspond very well, while the dotted lines (from the classical correction) deviate the most from the other two. The residual air speed errors are generally close to zero and in the worst cases they reach +−2 knots at the extremes of flight conditions and rotorcraft configurations. This illustrates that the method according to the invention for calibrating the air data indicating arrangement 1 works very well. In particular, since the third test flight covered the entire envelope of flight conditions and flight configurations. After having determined the regressor 3 as described, the nose boom 53 can thus be unmounted from the helicopter 50 because the air data indicating arrangement 1 which bases on the pitot tube data from the pitot tube device 51 and the static port data from the static port devices 52 can be operated without the nose boom 53 for obtaining the air speed and the altitude of the helicopter 50. Even more, the regressor 3 can as well be used in the air data indicating arrangement in other helicopters of the same type of helicopter as the helicopter 50 having the pitot tube device 51 and the static port devices 52 installed.

Figure 5:
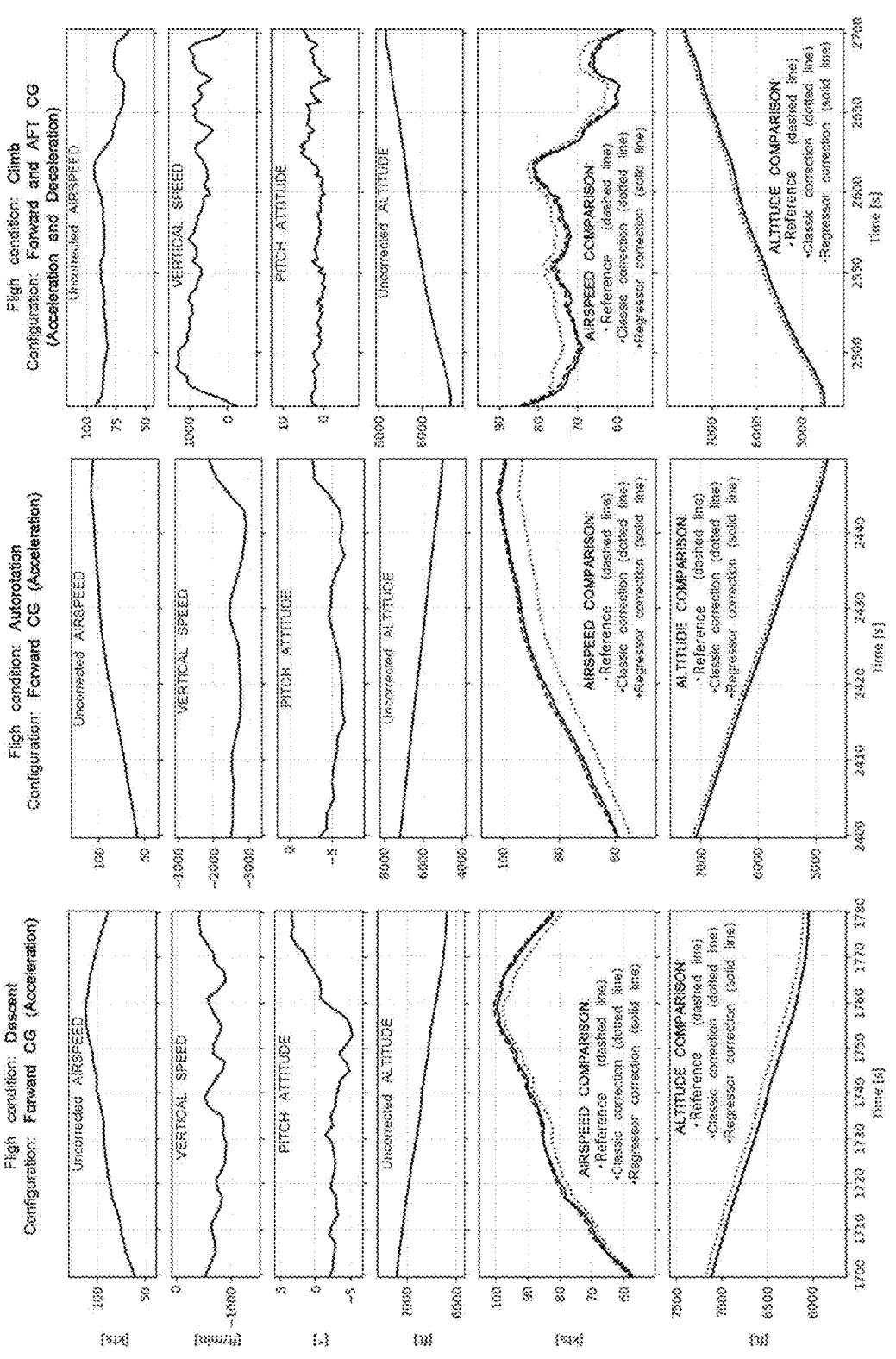

In order to illustrate in more detail how well the method according to the invention and the air data indicating arrangement 1 work, FIG. 5 shows detailed views of the data during three maneuvers flown during the third test flight. These charts show enlarged cutouts of the data shown in FIG. 4. The six charts shown on the left of FIG. 5 show a powered descent in the full forward center of gravity configuration, while the six charts shown in the middle of FIG. 5 show the data during a descent in autorotation with in the full forward center of gravity configuration. Furthermore, the six charts on the right of FIG. 5 show a climb first in the full forward center of gravity configuration and then in the full afterward center of gravity configuration.

In summary, it is to be noted that an air data indicating arrangement pertaining to the technical field initially mentioned and a method for calibrating such an air data indicating arrangement is provided, that enable the air data indicating arrangement to provide correct values of the air speed and the altitude for all flight configurations and flight conditions with the precision required by the regulatory specifications and which enable a cheaper and safer design procedure for designing an VTOL aircraft.

The invention claimed is:

1. An air data indicating arrangement for a vertical take-off and landing aircraft, the aircraft comprising a helicopter, for providing information on an air speed of said vertical take-off and landing aircraft and for providing information on an altitude of said vertical take-off and landing aircraft, wherein said vertical take-off and landing aircraft comprises:

a pitot tube device for determining a stagnation air pressure at a position of said pitot tube device and for providing pitot tube data including information on said stagnation air pressure at said position of said pitot tube device; and a static port device for determining a static air pressure at a position of said static port device and for providing static port data including information on said static air pressure at said position of said static port device, wherein said air data indicating arrangement is connectable to said pitot tube device for receiving said pitot tube data provided by said pitot tube device and wherein said air data indicating arrangement is connectable to said static port device for receiving said static port data provided by said static port device, wherein said air data indicating arrangement further comprises an air speed and altitude determination module, said air speed and altitude determination module configured to determine in real-time:

said air speed of said vertical take-off and landing aircraft; and said altitude of said vertical take-off and landing aircraft from flight data by using a regressor obtained by training an artificial neural network with training data, said flight data including at least:

a) said pitot tube data, b) said static port data, c) vertical speed data including information on a vertical speed of said vertical take-off and landing aircraft, and d) pitch attitude angle data including information on a pitch attitude angle of said vertical take-off and landing aircraft.

2. The air data indicating arrangement according to claim 1, wherein said flight data include roll attitude angle data including information on a roll attitude angle of said vertical take-off and landing aircraft.

3. The air data indicating arrangement according to claim 1, wherein said flight data include angle of sideslip data including information on an angle of a sideslip of said vertical take-off and landing aircraft.

4. The air data indicating arrangement according to claim 1, wherein said flight data include lateral acceleration data including information on a lateral acceleration of said vertical take-off and landing aircraft, or an amount of lateral acceleration of said vertical take-off and landing aircraft.

5. A vertical take-off and landing aircraft, the aircraft comprising a helicopter comprising an air data indicating arrangement for providing information on an air speed of said vertical take-off and landing aircraft and for providing information on an altitude of said vertical take-off and landing aircraft, wherein said vertical take-off and landing aircraft comprises:

a pitot tube device for determining a stagnation air pressure at a position of said pitot tube device and for providing pitot tube data including information on said stagnation air pressure at said position of said pitot tube device; and a static port device for determining a static air pressure at a position of said static port device and for providing static port data including information on said static air pressure at said position of said static port device, wherein said air data indicating arrangement is connectable to said pitot tube device for receiving said pitot tube data provided by said pitot tube device and wherein said air data indicating arrangement is connectable to said static port device for receiving said static port data provided by said static port device, wherein said air data indicating arrangement further comprises an air speed and altitude determination module, said air speed and altitude determination module configured to determine in real-time:

said air speed of said vertical take-off and landing aircraft; and said altitude of said vertical take-off and landing aircraft from flight data by using a regressor obtained by training an artificial neural network with training data, said flight data including at least:

a) said pitot tube data, b) said static port data, c) vertical speed data including information on a vertical speed of said vertical take-off and landing aircraft, and d) pitch attitude angle data including information on a pitch attitude angle of said vertical take-off and landing aircraft.

6. A method for calibrating an air data indicating arrangement according to claim 1, wherein the air speed and altitude determination module of said air data indicating arrangement is calibrated by obtaining the regressor by training the neural network with training data including training data sets, wherein each training data set is related to a flight condition and includes flight data obtained during flying in the respective flight condition with a vertical take-off and landing aircraft of a type of vertical take-off and landing aircraft, for which type said air data indicating arrangement is to be calibrated, wherein each training data set includes reference output data corresponding to the desired output of the regressor during flying in the respective said flight condition with said vertical take-off and landing aircraft of said type of vertical take-off and landing aircraft, wherein said flight data includes at least:

a) pitot tube data obtained from said pitot tube device of said vertical take-off and landing aircraft of said type of vertical take-off and landing aircraft during flying in the respective flight condition with said type of vertical take-off and landing aircraft, b) static port data obtained from said static port device of said vertical take-off and landing aircraft of said type of vertical take-off and landing aircraft during flying in the respective flight condition with said vertical take-off and landing aircraft of said type of vertical take-off and landing aircraft, c) vertical speed data including information on a vertical speed of said vertical take-off and landing aircraft of said type of vertical take-off and landing aircraft during flying in the respective flight condition with said vertical take-off and landing aircraft of said type of vertical take-off and landing aircraft, and d) pitch attitude angle data including information on a pitch attitude angle of said vertical take-off and landing aircraft of said type of vertical take-off and landing aircraft during flying in the respective flight condition with said vertical take-off and landing aircraft of said type of vertical take-off and landing aircraft.

7. The method according to claim 6, wherein in each training data set, the reference output data corresponding to the desired output of the regressor during flying in the respective said flight condition with said vertical take-off and landing aircraft of said type of vertical take-off and landing aircraft is obtained from one or more reference sensors of said vertical take-off and landing aircraft of said type of vertical take-off and landing aircraft during flying in the respective said flight condition.

8. The method according to claim 6, wherein said training data include for at least one flight condition of a list of flight conditions at least one training data set related to the respective said flight condition, wherein said list of flight conditions includes:

a) level flight at a first level flight speed, b) climb at a first climb rate and a first climb flight speed and c) descent a first descent rate and a first descent flight speed.

9. The method according to claim 6, wherein each training data set is related to a flight configuration and includes flight data obtained during flying in the respective flight configuration and in the flight condition to which flight condition the respective training data set is related to with the vertical take-off and landing aircraft of said type of vertical take-off and landing aircraft for which type of said vertical take-off and landing said air data indicating arrangement is to be calibrated, wherein said training data include at least one training data set related to at least one of the following list of flight configurations:

a) mid center of gravity, b) longitudinal full forward center of gravity, c) longitudinal full afterward center of gravity, d) longitudinal slight forward center of gravity, e) longitudinal slight afterward center of gravity.

10. The method according to claim 6, wherein said regressor is a neural network regressor, or a fully connected neural network regressor, including an output layer.

11. The method according to claim 10, wherein said output layer has a hyperbolic tangent (tanh) transfer function.

12. The method according to claim 10, wherein said regressor includes at least two hidden layers.

13. The method according to claim 12, wherein said at least two hidden layers each contain at least 32 neurons, or at least 60 neurons, or at least 100 neurons.

14. The method according to claim 12, wherein the first one of the least two hidden layers has a relu transfer function.

15. The method according to claim 6, wherein in each training data set, the data of each type of said flight data is a value obtained by filtering a length of at least 0.5 seconds of a stream of data of the respective said type of said flight data as measured in the respective flight condition.

* * * * *